United States Patent [19]

Carbone et al.

[11] Patent Number: 4,783,232
[45] Date of Patent: Nov. 8, 1988

[54] FILAMENT WINDING USING A ROTATIONALLY MOLDED INNER LAYER

[75] Inventors: Pat. J. Carbone, Maplewood; Raleigh E. Willson, Flanders; Frank Petruccelli, Boonton, all of N.J.

[73] Assignee: Allied-Signal Inc., Morris Township, Morris County, N.J.

[21] Appl. No.: 5,346

[22] Filed: Jan. 12, 1987

Related U.S. Application Data

[63] Continuation of Ser. No. 529,000, Sep. 2, 1983, abandoned, which is a continuation of Ser. No. 361,683, Mar. 25, 1982, abandoned.

[51] Int. Cl.⁴ .................... B29C 41/06; B31C 13/00
[52] U.S. Cl. .................... 156/172; 156/245; 264/311
[58] Field of Search ............ 156/170, 172, 74, 245, 156/425; 264/311, 312

[56] References Cited

U.S. PATENT DOCUMENTS

| 3,652,368 | 3/1972 | Formo | 264/311 |
| 4,123,307 | 10/1978 | Lemelson | 264/311 |
| 4,453,995 | 6/1984 | Morrisey | 156/172 |
| 4,705,468 | 11/1987 | Le Breton | 156/172 |

OTHER PUBLICATIONS

Filament Winding, Rosato and Grove, Jr., Inter Science Publishers, J. Wiley & Sons, Inc., (copyright 1964). Chapters 3 and 4.
Filament Winding with Type 3 Q Roving, Owens Corning Fiberglass Manual.

Primary Examiner—Michael Wityshyn
Attorney, Agent, or Firm—Richard A. Negin; Roger H. Criss

[57] ABSTRACT

A method of filament winding an article having an inner layer and a filament wound layer on the outer surface of the inner layer. The inner layer is rotationally molded. The method is useful in making hollow enclosed articles. The present invention includes hollow enclosed articles having a polymeric inner layer and a filament wound layer on the outer surface of the inner layer.

10 Claims, 1 Drawing Sheet

FILAMENT WINDING USING A ROTATIONALLY MOLDED INNER LAYER

This application is a continuation of Ser. No. 529,000, filed Sept. 2, 1983, now abandoned, which is a continuation of Ser. No. 361,683, filed Mar. 25, 1982, now abandoned.

BACKGROUND OF THE INVENTION

The present invention is in the field of filament winding, more particularly, the invention relates to a combination of filament winding and rotational molding.

Filament wound articles and methods of filament winding are described by Rosato and Grove, Jr., *Filament Winding*, Interscience Publishers, John Wiley & Sons, Inc., (Copyright 1964). This text discloses the development, manufacture, applications, and design relating to filament winding. Briefly, the process of filament winding comprises winding filamentous nonmetallic or metallic materials in fibrous or tape form continuously on a form or mandrel which shape corresponds to the inner structure of the part being fabricated. Generally, the filaments in whatever form are encased in a resin matrix. The filaments are either wetted out immediately before winding or impregnated ahead of time. The resin contains the reinforcement, holding it in place, sealing it from mechanical damage, and protecting it from environmental deterioration. Where the resin is a crosslinkable resin, the filament wound article is crosslinked or cured. After curing the form may be removed, discarded, or used as an integral part of the structural item.

Filament winding is carried out on specially designed automatic machines. There is precise control of the winding pattern and the direction of the filaments as required for maximum strength. This winding pattern can only be achieved with controlled machine operation, which can be computer controlled. Filament winding results in a strong, lightweight part.

Filament winding is useful to make hollow enclosed articles having high strength and lightweight. It is known to blow-mold small tanks from polymers such as polyethylene and filament wind the tanks. These small tanks have been used as lightweight air tanks which can be carried on the back of a person such as a fireman. Injection molded parts have been fused together to form enclosed articles such as pool filters. These pool filters have been filament wound.

In certain applications, it is known to use a liner material inside of the filament wound structure. This material has been applied around the mandrel prior to the wrapping operation. The inner liner has been used as a insulator and can be made of a rubber-plastic sheet or reinforced plastics.

A method of filament winding of particular interest is integral case winding. In this process, rocket propellent castings are completed by filament winding to form an integral filament wound rocket motor case.

Although the above discussed methods of filament winding are useful, they have certain limitations. For example, filament winding of blow molded enclosed polyethylene tanks can only be used to produce tanks of sizes and shapes limited to blow molding operations. Further, in blow molding, the blow molded article has a non-uniform cross sectional wall thickness. Enclosed articles produced by fusing together of injection molded parts require the step of fusing or adhesively bonding together the various parts with the inherent risk of failure at the seams.

Rotational molding, also known as rotomolding, is used in the manufacture of hollow objects from thermoplastics. In the basic process of rotational molding, solid or liquid polymers are placed in a mold. The mold is first heated and then cooled while being rotated about two perpendicular axes simultaneously. Many polymers can be used in the rotational molding process. Popular polymers for this use are polyolefins such as polyethylene. It is also known to use polycarbonates, crosslinkable polyethylene, nylon, and other materials. In selecting the rotational molding grade formulation, care must be taken to assure that there will not be thermal degradation during the heating cycle. A general discussion on rotational molding is given in *MODERN PLASTICS ENCYCLOPEDIA* 1979–1980, Volume 56, No. 10A, beginning at Page 381.

SUMMARY OF THE INVENTION

The present invention is a method of filament winding an article having an inner layer and a filament wound layer on the outer surface of the inner layer. The method comprises the steps of rotationally molding the polymeric, preferably polyamide inner layer and filament winding of fiber and polymer binder composite layer on the outer surface of the inner layer. The method does not require the use of a mandrel. The rotationally molded inner layer provides support for the step of filament winding. The method of the present invention is particularly useful in a method to filament wind hollow enclosed articles having a polymeric inner layer and a filament wound layer on the outer surface of the inner layer. An embodiment of the present invention includes a filament wound hollow, enclosed article having volume as large as possible by rotational molding including volumes of from 2 gallons (0.0076 m$^3$) to 23,000 gallons (87.2 m$^3$), typically from 50 gallons (0.19 m$^3$) to 10,000 gallons (37.9 m$^3$). The process of the present invention is particularly useful to make hollow enclosed articles having a volume of at least 500 gallons (1.895 m$^3$) comprising a polymeric, preferably polyamide, inner layer having an outer surface and a filament wound layer on the outer surface.

The present invention also includes articles having a rotationally molded inner layer and a filament wound outer layer. There can be an interlayer between the rotationally molded inner layer and the filament wound outer layer. The articles can include hollow enclosed articles. Articles include tanks which can be used to store hydrocarbons (gasoline, oil) and gases. The tanks can be used above or below ground. Large complex shaped articles can be made which include airplane fuselages.

Objects, features and advantages of the present invention will become apparent by reference to the following specification.

DESCRIPTION OF THE PREFERRED EMBODIMENTS

The present invention is a method of filament winding an article having a polymeric inner layer. The process comprises the steps of rotationally molding a polymeric inner layer having an outer surface and filament winding a fiber and polymer binder composite layer on the outer surface of the inner layer.

Figure 1:
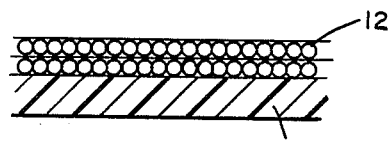
FIG. 1 is a sectional view of a portion of the wall of the present invention having an inner layer and a filament wound outer layer.

The method is particularly useful in filament winding a hollow enclosed article having a polymeric inner layer and a filament wound layer on the outer surface of the polymeric inner layer. FIG. 1 shows a cross sectional view of a portion of a wall of an article of the present invention filament wound by the method of the present invention. There is an inner polymer layer 11 and an outer filament wound layer 12. The outer layer can be made of one or more layers of filaments depending on the filament material used and the property requirements of the article. Filament wound layer shows two layers of resin impregnated filaments.

The process of filament winding includes the steps of continuously winding a reinforcing filament on a rotationally molded form or inner layer which becomes an integral part of the article. A separate form or mandrel whose shape corresponds to the inner surface of the part being fabricated is not required. The filamentous material can either be metallic or nonmetallic, processed in either fibrous or tape forms. The most common filamentous material is glass in the form of continuous filament, roving, yarn, or tape. The filaments, preferably glass, are encased in a resin matrix, either wetted out immediately before winding or impregnated ahead of time. High strength fibers such as carbon fibers and polyaramides can also be used when their properties are required. The resin matrix contains the reinforcement, holds it in place, seals it from mechanical damage, and protects it from the environment. After the rotationally molded form has been wound with the reinforcing filamentous material the matrix is cured.

The filament winding of fiberglass onto the rotationally molded inner layer can be conducted in accordance with the disclosure in Filament Winding with Type 30 having, Publ. No. 5-CR-6516, published by Owens-Corning Fiberglass Corp., hereby incorporated by reference.

In the process of the present invention, the filaments, preferably impregnated in a polymeric matrix, are wound onto a rotationally molded form. This form provides the surface support necessary for filament winding. The form has sufficient strength to retain its shape. No auxilliary form or mandrel is necessary for support of the surface onto which the filaments are wound. The rotationally molded form can be an open form, or an enclosed hollow form. The rotationally molded polymeric inner layer form has an outer surface onto which the filaments are wound. The rotationally molded form becomes a permanent integral part of the structure. Where the polymeric matrix is a crosslinkable type such as crosslinkable epoxy or polyester, the matrix is cured or crosslinked.

Figure 2:
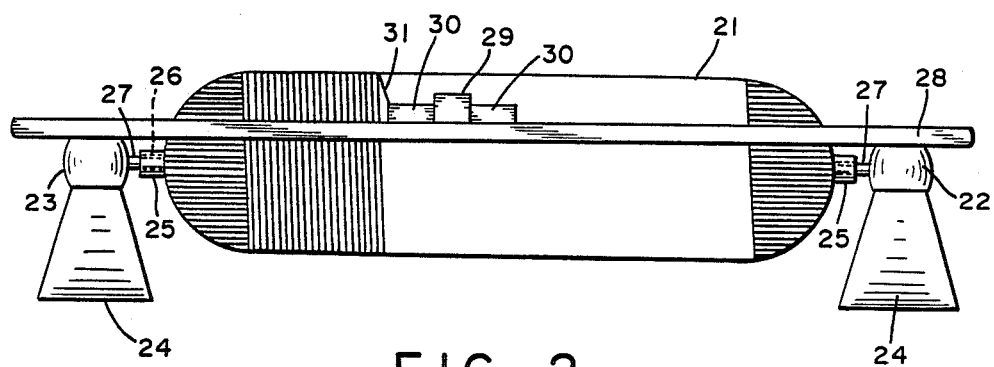
FIG. 2 is a hollow enclosed tank made by the method of the present invention in the process of being wound.

FIG. 2 shows a hollow enclosed tank 21 being filament wound. This embodiment is a nonlimiting example of one method to practice the process of the present invention. The tank 21 is made from a rotationally molded inner layer. This inner layer acts as the form. The inner layer is attached to rotatable chucks, one chuck being a driven chuck 22 and one chuck being a free turning chuck 23. The chucks are supported on chuck supports 24. The rotationally molded form can be attached to the chucks by means similar to those used to attach mandrels to the chucks. In FIG. 2 axial protrusions 25 can be molded onto the ends of the rotationally molded inner layer. Threads 26 can be molded or machined into the protrusions 25. The rotationally molded inner layer is mounted on the chucks 22 and 23 by chuck connector shafts 27.

Upon mounting the rotationally molded inner layer or form it is ready to be filament wound. There is a supported (support not shown) winding track 28 on which winding head 29 can move parallel to the longitudinal axis of the inner layer, horizontal in FIG. 2. Winding head 29 can be any suitable type of winding head known in the art. Filaments 31 are fed from the winding head 29 onto the rotationally molded inner layer. The filaments can be preimpregnated or impregnated immediately prior to being filament wound. In FIG. 2 preimpregnated filaments 31 are unwound from creels in creel storage container 30 which travel with winding head 29. Alternately, the filaments can be fed from creels external of the winding apparatus. The tank 21 can be wound longitudinally by the winding head 29 traveling around the tank on the track 28. The tank can be indexed to turn on its longitudinal axis after each revolution. Additionally, the tank can rotate about its axis on chuck 22, 23 resulting in circumferential winds with the winding head moving along the track 28. Thereby, the angle of the wind can be varied from longitudinal (axial) to circumferential.

Upon completion of the winding step the resin to matrix is cured. Feed ports can be cut into the tank and it can optionally be coated with other coatings such as paint.

In summary, the filament winding process of the present invention generally has the steps of impregnating the filamentous material, winding the filamentous material on a rotationally molded inner layer or form which supports the winding, and curing the resin matrix in which the filamentous material has been formed.

Optionally, there can be an interlayer applied between the outer surface of the rotationally molded form and the filament wound layer. The interlayer can be a layer of chopped fibers or flock sprayed on with a resin binder. Chopped fiber roving or chopped fiber mats can be plied onto the form during the filament winding process. Other interlayers which can be used include a variety of polymers which can be coated or sprayed onto the form. Additional materials include a layer of wood such as balsa wood or foam such as foamed plastics. The interlayer is applied onto the outer surface face of the inner layer. The filaments are wound on top of the interlayer.

The rotationally molded form can be made of any polymer suitable for rotational molding which provides a form which is suitable for use in the filament winding process. Typically, such a form must be able to withstand the tension of the filament winding step. It must be stiff enough not to deform while being wound. The rotationally molded form must also be able to withstand heating necessary to cure the resin matrix in which the filament windings are embedded or to withstand any exothermic crosslinking reactions of the resin matrix. The form cannot soften and deform under the conditions incurred during the process of the present invention.

An indication of the degree of tension with which the rotationally molded inner form must withstand is indicated at Chapter 5, page 135 of Rosato, ibid, herein incorporated by reference. Tensions in the rovings can be as high as 24 pounds force (106.8 N).

The polymeric inner layer can be made from polymers which include but are not limited to polyamides, polyolefins such as polyethylene, polypropylene and crosslinkable polyethylene, polycarbonates, and fluoropolymers such as the copolymer of ethylene and chlorotrifluoroethylene, polyvinylchloride, acetels, and polyurethanes, as well as mixtures thereof. The preferred rotational molding material used to make forms for filament winding is polyamide, most perferably polycaprolactam. Polyamides provide the stiffness and strength needed to withstand the stresses and forces which it is subjected to during the filament process. The polyamides can withstand high temperatures which can accompany the crosslinking or curing of the resin matrix in which the filaments are embedded Polycaprolactam provides a liner of material which is resistant to a variety of materials including hydrocarbons such as gasoline, oil and a variety of hydrocarbon gases.

Rotationally molded forms are particularly useful for forming large and/or irregularly shaped filament wound articles, particularly those which are enclosed and hollow. The rotational molding process results in an enclosed form having uniform wall thickness over the entire cross section. Further, the rotational molded form has no seams, other points of leakage, or failure sites.

The rotationally molded inner form useful in the method of the present invention can be mounted in a winding machine in a manner similar to the mounting of mandrels presently in use. In the process of the present invention the surface of the rotationally molded form is self-supporting. The step of filament winding is conducted onto the surface of the rotationally molded form without the necessity of auxillary surface support by a means such as a mandrel. The rotationally molded form can be held in place either by having holding means molded on during the rotational molding process such as protrusions 25 in FIG. 2, or by suitable attachments made to the form by attachment means such as nuts and bolts, or clamps. The reinforcement feeding head winds the reinforcing filamentous material onto the rotational molded form in the same manner as the mandrels or forms presently used are wound. Typical methods are described in Chapter 5 of Rosato, ibid., herein incorporated by reference.

An advantage of the present invention is that a mandrel is not necessary to make the articles of the present invention in the methods of the present invention. The avoidance of a mandrel is particularly useful in enclosed hollow articles. Enclosed hollow articles in the past required complicated collapsible mechanical mandrels. Alternately, plaster mandrels were used which had to be destroyed within the article and then removed. The present invention is particularly useful to make enclosed or hollow articles which are lined without the necessity of mechanically, or in some other way, fusing end fittings or closures on.

After the rotationally molded article has been filament wound, if the resin which impregnates the filamentous material is crosslinkable, it can be crosslinked. The crosslinking temperatures are generally from room temperature to from about 200° F. (93° C.) and can be up to about 330° F. (166° C.). It is recognized that a variety of resins matrixes can be used which can be crosslinked at suitable temperatures which correspond to the particular resin matrix. Additionally, certain crosslinking reactions are exothermic. For these reasons, it is preferred that the rotationally molded inner layer be made of a material which can remain stiff and not deform or melt at the necessary crosslinking temperatures.

Reinforcement materials useful as the filamentous material in the filament winding process are discussed in Rosato in Chapter 3, ibid. hereby incorporated by reference. The common reinforcing materials discussed include the most preferred one which is glass fibers. The glass reinforcement applicable to winding operations are principally continuous-fiber filament, roving, yarn, and unidirectional tape. The glass may be preimpregnated with resin or dipped in the resin immediately before filament winding.

The glass compositions most generally used for commercial fibers are identified as low alkali, lime-alumina borosilicates or soda-lime borosilicates. The glass fibers most commonly used in filament winding are Type E glass.

Typical fiber glass formulations and useful glasses are discussed in Rosato, ibid. Conventionally, the glass fibers used in the process of the present invention have a diameter from about 0.0038 inches up to 0.005 inches. Increasing the diameter results in increased compressive strength in reinforced laminates. For typical glass having smaller diameter fibers, there is from about 10 to 15% resin preferred. However, with higher diameter glasses there can be up to 30% by weight of resin. It is noted that glasses are designated by various letters in the trade going from A though L, all of which can be used. These letters generally correspond to the diameter of the glass as well and all continuous fibers glass could be used in the process of the present invention ranging in diameters from over 0.00006 inches (0.15 mm) up to 0.01 inches (2.54 mm). Sizing is preferably applied to the glass. Special high modulus fibers are useful particularly in applications requiring great buckling resistance and/or hoop strength of enclosed articles.

Other reinforcing filamentous materials which can be used include carbon fiber, beryllium, steel, steel alloy, titanium strip, titanium alloy steel alloy strips. As noted above, boron fibers are also useful in the present invention. Other materials which are useful include hollow glass fibers and metal wires including steel, aluminum, tungsten, tantalum, molybdenum, magnesium. Preferably, most of the wires are filament wound after being preimpregnated or impregnated immediately prior to the filament winding process. Additionally, various synthetic fibers can be used to filament wind including but not limited to polyaramids, fluorocarbons, polyesters, acrylics, polyamides, cellulose acetate and rayon. Natural fibers which can be used include cotton, cecil, and wool. The various fibers can have a variety of cross sectional shapes.

Various tapes useful in filament winding include both metal tapes as well as plastic tapes. The plastic tapes usually contain unidirectional preimpregnated glass fibers.

The tapes as well as the fibers are preferably impregnated in a polymeric material. Preferred polymeric materials are crosslinkable resins, although thermoplastic polymers can be used. The most preferred polymeric resin systems are epoxy resin and crosslinkable polyester resin systems. With the most preferred epoxy being the condensation product of epichlorohydrin and bisphenol A (bis(4-hydroxyphenyl)dimethylmethane). Useful resin systems are discussed in detail in Rosato, Chapter 4, ibid. hereby incorporated by reference. Polyester resins are the polycondensation products of dicarboxylic acids with dihydroxy alcohols. Maleic and fumaric acids are the chief unsaturated acids used. The principal dihydroxy alcohols used are ethylene, propylene, diethylene, and dipropylene glycols. These resins have the ability to cure or harden at room temperature under no pressure or low pressure when catalyzed. Additional resins include phenolic resins, silicone resins, polybenzimidazole resins, polyurethane, and polyurethane-epoxy. The organic matrix materials as well as the inner layer materials are limited by the temperature capabilities.

After the filament winded article of the present invention has been cured, the surface of the article can be treated. The surface treatment can be used to remove lubricants, adhesives, and coupling agents used on the glass filament during processing.

The present invention includes articles which have a rotationally molded inner layer, having an outer surface, an optional interlayer on the outer surface of the inner layer, and a filament wound layer on the outer surface of the inner layer. Where an interlayer is used it is located between the inner layer and the filament wound layer. The filament wound layer can be an impregnated layer made with the filamentous materials and matrix polymers described above.

The inner layer is rotationally molded and is limited in shape only by the limitations of the rotational molded process. The articles of the present invention includes hollow, enclosed articles.

The articles of the present invention have a controllable wall thickness. The wall thickness of the inner layer is preferably uniform. The size of the inner layer or form is limited only by the available rotational molding equipment available. Inner layers or forms can be made having a volume of 2 gallons (0.00758 m$^3$) up to 23,000 gallons (87.17 m$^3$). However as equipment becomes available for larger volume inner layers or forms, that equipment can be used for the process and articles of the present invention. The outer layer can have as many layer of filaments as necessary. This depends on filament size and strength requirements. The amount of resin matrix can also be varied. It is recognized that the inner layer can be as thin or thick as possible using rotational molding techniques.

The article of the present invention can be made in a variety of shapes as well as sizes. Any shapes which can be rotationally molded can be used in the process of the present invention to make the articles of the present invention. Additionally, it is noted that various shapes, and various shapes of certain sizes, can only be made using rotational molding. The articles of the present invention can be long and narrow, and can be of irregular shapes. These shapes can vary along the dimensions length, width and height. The variation of shape can include repeated increases and decreases along each dimension. The outer surface of the filament wound composite layer can be treated, coated and further built upon as known in the art.

Specific articles in the present invention includes tanks which are preferably cylindrical such as the tank in FIG. 2, and spherical tanks. Preferably tanks have a polycaprolactam inner layer ⅛ inch (0.32 cm) to ½ inch (1.27 cm) thick, and more preferably ⅛ inch (0.32 cm) to ¼ inch (0.64 cm) thick, and a fiber glass filament wound outer layer, and preferably being greater than 50 gallons (0.190 m$^3$) in volume. Volumes can be from 50 gallons (0.190 m$^3$) to 23,000 gallons (87.17 m$^3$) The tanks are useful as storage tanks for gases, hydrocarbon liquids such as gasoline and oil, and as septic tanks. The tanks can be used above or below the ground.

Figure 3:
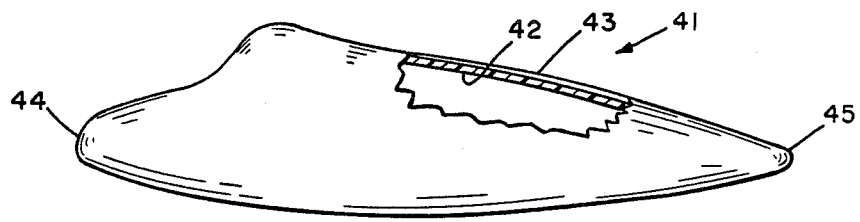
FIG. 3 is an airplane fuselage made by the method of the present invention with a partial sectional view.

The present invention also includes airplane fuselages such as the airplane fuselage 41 of FIG. 3. The airplane fuselages and elongated hollow articles, have an inner polymeric layer 42, preferably polycaprolactam which is ⅛ inch (0.32 cm) to ½ inch (1.27 cm), and more preferably ⅛ inch (0.32 cm) to ¼ inch (0.64 cm) inches thick. It is noted that the inner polymeric layer primarily provides a completed inner form on which filaments can be wound, without the necessity of a complicated, and/or multipart mandrel. The inner layer can be any polymer having sufficient stiffness to support the outer surface shape during filament winding. A preferred polymer is polycaprolactam. The outer layer 43 is a filament wound layer. The filaments in the filament wound layer can be glass or carbon.

The articles of the present invention can have holes cut into them such as inlet parts in the storage tanks and doors and windows in the airplanes. When this is done, a protective flange can be placed around the edges of the hole.

The polymeric inner layer is preferably a polyamide. The term "polyamide" used in the practice of the present invention is intended to include long chain synthetic polymers which have regularly recurring amide groups as an integral part of the main polymer chain; and hence, include amide-ester copolymers. Suitable polyamides can be prepared by polymerization of a difunctional monomer or equivalently, its cyclized lactam (e.g., epsilon-aminocaproic acid or caprolactam, respectively) or by the reaction of a conjugate pair of monomers, for example, a diamide and a dicarboxylic acid (e.g., hexamethylenediamine and adipic acid), or a linear aminoaliphatic acid such as epsilon-amino undecanoic acid.

The airplane fuselage 41 shows the variety of one piece filament wound shapes which can be made by the method of the present invention. The fuselage has a rounded nose 44 and a changing cross sectional shape ending in a narrow tail 45. Windows and doors can be cut out as desired.

Suitable polylactams can be produced by the polymerization of lactam monomers of the formula

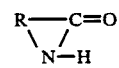

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryl lactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecaneoic, etc. Also included are copolymers or blends of polyamides of the above categories.

Typically, the number average molecular weight of these polymers is between about 10,000 and about 50,000, preferably 15,000 to 40,000 and more preferably 20,000 to 30,000. This is because mechanical properties improve rapidly until about 20,000, and processing starts to become more difficult above 30,000.

Polyepsiloncaprolactam is the preferred polyamide for use in the present invention. U.S. Ser. No. 256,887 filed Apr. 4, 1981 describing a preferred composition or process is hereby incorporated by reference. Polyepsiloncaprolactam suitable for use herein can contain a variety of terminal functionality. Preferred terminal functionality is that containing:

(a) A carboxyl group attached to both ends of the polyamide chain;

(b) A carboxyl group attached to one end and an acetamide group attached to the other end of the polyamide chain;

(c) An amine group attached to both ends of the polyamide chain; and (d) A carboxyl group attached to one end and an amino group attached to the other end of the polyamide chain. It is preferred that the polyepsiloncaprolactam have more chain ends terminated by acid groups than by amine groups. When this is the case, the composition can be rotationally molded in the presence of oxygen. However, it is preferred to use an inert, oxygen-free atmosphere, such as nitrogen or carbon dioxide, to prevent oxidation even where there is excess end groups terminated with carboxyl groups. If there are not more polyepsiloncaprolactam chain ends terminated with acid groups than with amine groups, an inert atmosphere is required for a satisfactory product with the polyepsiloncaprolactam stabilized by a stabilizer such as copper based compound, preferably cuprous iodide.

Polyamides other than polyepsiloncaprolactam can be used, but polyepsiloncaprolactam is preferred. For example, polyhexamethyleneadipamide has a higher melting temperature and flows with more difficulty than polyepsiloncaprolactam. The polyepsiloncaprolactam provides a lower melting, easier processing product wherein the pellets of material flow or knit more readily into each other.

The polyepsiloncaprolactam composition of this invention does not require the use of a plasticizer for successful rotational molding, although caprolactam can be used as a plasticizer.

During the rotational molding process, the composition is heated to from about 121° C. (250° F.) to about 399° C. (750° F.), and preferably from 280° C. (550° F.) to 352° C. (675° F). If the temperature is too high optimum molding properties are not attained.

The rotational molding process with the above described composition comprises the steps of preparing a composition of the polymer, preferably polyamide and more preferably polycaprolactam. The composition is preferably in pellet form. This composition is fed into the rotational mold. The composition is heated within the mold as it is rotated. Generally, the rotational mold rotates simultaneously along two perpendicular axes. The mold is heated until the pellets within the mold melt and flow together on the inside surface of the mold. The mold is then cooled and the molded article is removed.

The polymer composition for rotational molding can be fed into the mold in powder or pellet form. If polycaprolactam is used and the particles are too small, their surface area is so large that exposure to the atmosphere results in excessive moisture pickup. For example, a 35 mesh size polycaprolactam powder exposed to the atmosphere is unsatisfactory unless it is kept dry. It is preferred to use pellets which are not as sensitive to moisture pickup. If the polycaprolactam particles are too large, it takes a longer time for them to melt and thinner parts cannot be made. Pellets can be from about 1/32 by 1/32 inch (0.079 cm × 0.079 cm) (or about 1/32 inch (0.079 cm) average diameter) to about ⅛ by ⅛ inch (0.318 cm × 0.318 cm) (or about 150 inch average diameter). A preferred pellet shape is a cylindrical pellet from about 1/32 to 1/16 inch (0.79 cm to 0.159 cm) in diameter, by about 1/16 (0.159 cm) to ⅛ inch (0.318 cm) long.

The polycaprolactam can be processed in most commercial rotational molding machines. The temperatures range during the heating step from about 288° C. (550° F.) to about 399° C. (750° F.), and preferably from about 302° C. (575° F.) to about 352° C. (675° F). If the temperature is too high during rotational molding, the impact properties deteriorate. The temperature must be high enough for the pellets to fuse together to form a smooth inner surface of the molded article. The mold is heated by suitable means known in the art. Generally, the mold rotates within a forced air circulating oven.

After the heating step the mold is cooled. The part must be cool enough to be easily removed from the mold and retain its shape. Preferably, the mold is removed from the oven while continuing to rotate. Cool air is first blown on the mold. The air can be at ambient temperature. After the air has started to cool the mold for a controlled time period, a water spray can be used. The water cools the mold more rapidly. The water used can be at cold water tap temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times will depend on the equipment used and the article molded. Specific factors include the part thickness and mold material. Typical conditions for a ⅛ inch (0.318 cm) thick polycaprolactam molding in a steel mold are to heat the part in an oven with air at about 343° C. (650° F.) for about 19 minutes. The part is cooled in ambient temperature forced air for about 5 minutes and then in a tap water spray at about 10° C. (50° F.) for about 5 minutes. Optionally, the part is cooled in ambient temperature forced air for an additional 2 minutes.

During the heating and cooling steps, the mold containing the molded article is continually rotated along two perpendicular axes. The rate of rotation of the mold about each axis is limited by machine capability and the shape of the article being molded. A typical range of operation which can be used with the present invention is to have a ratio of rotation of the major axis to the minor axis of from 1:2 to 1:10, and 2:1 to 10:1.

Preferably, the rotational molding is conducted under an inert atmosphere within the mold. However, this is not necessary, although it is preferred when using the preferred composition containing polyepsiloncaprolactam having an excess of chain ends terminated by a dicarboxylic acid group. When it is desired to use an inert atmosphere, the mold cavity can be purged with nitrogen. Most rotational molding machines have arms which are drilled for gas injection, so that all that is necessary is to connect a nitrogen gas cylinder to the arm, using the rotary valves in the connection. Alternatively, dry ice can be added to the mold cavity at the time the resin is charged to the mold. The dry ice will sublime during the heating cycle and provide an inert atmosphere.

The mold surface can be sprayed or coated with a mold release coating. A preferred mold release agent is a baked-on silicon based mold release coating, such as Freekote ®. This coating is baked for 15-20 minutes at about 282° C. (450° F.) to 343° C. (550° F.). The mold is cooled and sanded on the inside. The sanded surface allows the composition to maintain contact during molding and not release to readily and warp while being cooled. Yet upon cooling, the molded article easily releases. A vent can be used to avoid pressure buildup on the inside of the mold during the heating step.

While exemplary embodiments of the invention have been described, the true scope of the invention is to be determined from the following claims:

What is claimed:

1. A method of filament winding a hollow, enclosed article having a polymeric inner layer having an outer surface, and a filament wound layer consisting essentially of the steps of:
    rotationally molding a hollow, enclosed seamless inner layer;
    rotationally molding holding means onto the hollow, enclosed seamless inner layer;
    filament winding a fiber and binder composite layer on the outer surface of the inner layer; and
    supporting the inner layer solely by the holding means during filament winding.

2. The method as recited in claim 1 wherein the polymeric inner layer is a polymer selected from the group consisting of: polyamides, polyolefin, polycarbonates, fluoropolymers, polyacetals, polyurethanes, and mixtures thereof.

3. The method as recited in claim 2 wherein the polymeric inner layer is a polyamide.

4. The method as recited in claim 3 wherein the polymeric inner layer is polycaprolactam.

5. The method as recited in claim 1 wherein the enclosed hollow article has a volume of front 50 gallons (0.19 m$^3$) to 23,000 gallons (87.2 m$^3$).

6. The method as recited in claim 5 wherein the enclosed hollow article has a volume of from 500 gallons (1.9 m$^3$) to 10,000 gallons (37.9 m$^3$).

7. The method as recited in claim 1 wherein the holding means is a protrusion.

8. An improved method of filament winding a hollow enclosed article of the type wherein a fiber and polymer binder composite layer is filament wound on the outer surface of an inner form and having a volume of from 500 gallons (1.9 m$^3$) to 10,000 gallons (37.9 m$^3$) the improvement consisting essentially of the step of rotationally molding a hollow enclosed seamless inner layer having an outer surface on which a fiber and polymer binder composite layer is filament wound.

9. A method of filament winding a hollow, enclosed article having a polymeric inner layer having an outer surface, and a filament wound layer consisting essentially of the steps of:
    rotationally molding a hollow, enclosed seamless inner layer;
    rotationally molding protrusions onto the hollow, enclosed seamless inner layer;
    filament winding a fiber and binder composite layer on the outer surface of the inner layer; and
    supporting the inner layer by the protrusions during filament winding.

10. A method of filament winding an irregularly shaped article having a polymeric inner layer having an outer surface, and a filament wound layer consisting essentially of the steps of:
    rotationally molding a hollow, enclosed, seamless, irregularly shaped polymeric inner layer;
    rotationally molding protrusions onto the inner layer;
    filament winding a fiber and binder composite layer on the outer surface on the inner layer; and
    supporting the inner layer by the protrusions during filament winding.

* * * * *